(12) United States Patent
Park et al.

(10) Patent No.: US 11,215,879 B2
(45) Date of Patent: Jan. 4, 2022

(54) DISPLAY DEVICE

(71) Applicant: Samsung Display Co., Ltd., Yongin-Si (KR)

(72) Inventors: Je Hyeong Park, Seoul (KR); Dong Lim Kim, Suwon-si (KR); Wan Namgung, Asan-si (KR); Ji Eun Park, Anyang-si (KR); Dong Kyun Seo, Asan-si (KR); Min Hee Son, Anyang-si (KR); Hyoung Wook Song, Cheonan-si (KR); Beom Hee Han, Hwaseong-si (KR); Ki Pyo Hong, Hwaseong-si (KR)

(73) Assignee: Samsung Display Co., Ltd.

( * ) Notice: Subject to any disclaimer, the term of this patent is extended or adjusted under 35 U.S.C. 154(b) by 51 days.

(21) Appl. No.: 16/778,832

(22) Filed: Jan. 31, 2020

(65) Prior Publication Data

US 2021/0018784 A1 Jan. 21, 2021

(30) Foreign Application Priority Data

Jul. 19, 2019 (KR) ........................ 10-2019-0087533

(51) Int. Cl.
*G02F 1/1339* (2006.01)
*G02F 1/1362* (2006.01)
(Continued)

(52) U.S. Cl.
CPC ........ *G02F 1/13394* (2013.01); *G02F 1/1368* (2013.01); *G02F 1/13396* (2021.01); *G02F 1/136222* (2021.01)

(58) Field of Classification Search
CPC ........... G02F 1/13394; G02F 1/133514; G02F 1/133512; G02F 1/136222; G02F 1/1368; G02F 1/136286; G02F 1/13396; G02F 1/13398; G02F 1/136209; G02F 1/133345; G02F 1/133357; G02F 1/1339; G02F 1/136227; G02F 1/1343; G02F 1/134345; G02F 1/136218; G02F 1/1333;
(Continued)

(56) References Cited

U.S. PATENT DOCUMENTS

| 2011/0069258 | A1* | 3/2011 | Joo | G02F 1/133514 |
| | | | | 349/106 |
| 2015/0185566 | A1* | 7/2015 | Choi | G02F 1/13394 |
| | | | | 349/42 |
| 2017/0192280 | A1* | 7/2017 | Kwak | G02F 1/136286 |

FOREIGN PATENT DOCUMENTS

| KR | 10-2017-0084385 A | 7/2017 |
| KR | 10-2018-0107442 A | 10/2018 |

(Continued)

*Primary Examiner* — Thoi V Duong
(74) *Attorney, Agent, or Firm* — Innovation Counsel LLP

(57) ABSTRACT

A display device according to an exemplary embodiment includes: a plurality of transistors disposed on a substrate; a plurality of pixel electrodes electrically connected to the plurality of transistors; a plurality of first color filters, a plurality of second color filters, and a plurality of third color filters disposed between the plurality of transistors and the plurality of pixel electrodes; and a plurality of main spacers and a plurality of sub-spacers disposed on the pixel electrode, wherein the plurality of main spacers and the plurality of sub-spacers are disposed to overlap selected portions of the plurality of first color filters in a plan view, respectively, and not to overlap the plurality of second color filters and the plurality of third color filters in a plan view.

18 Claims, 12 Drawing Sheets

(51) Int. Cl.
*G02F 1/1335* (2006.01)
*G02F 1/1368* (2006.01)

(58) Field of Classification Search
CPC ................. G02F 1/1335; G02F 1/1362; G02F 2201/123; G02F 2201/52
See application file for complete search history.

(56) References Cited

FOREIGN PATENT DOCUMENTS

| | | | |
|---|---|---|---|
| KR | 10-2018-0133979 A | 12/2018 | |
| KR | 10-2018-0135529 A | 12/2018 | |

* cited by examiner

DISPLAY DEVICE

CROSS-REFERENCE TO RELATED APPLICATION

This application claims priority to and the benefit of Korean Patent Application No. 10-2019-0087533 filed in the Korean Intellectual Property Office on Jul. 19, 2019, the entire contents of which are incorporated herein by reference.

BACKGROUND

(a) Field

The present disclosure relates to a display device.

(b) Description of the Related Art

Display devices such as liquid crystal displays (LCDs) and organic light emitting diode displays (OLEDs) generally include a display panel including a plurality of pixels which are units for displaying an image.

The display panel of the liquid crystal display includes a liquid crystal layer including liquid crystal, a field generating electrode for controlling alignment of the liquid crystal of the liquid crystal layer, a plurality of signal lines for applying a voltage to at least a portion of the field generating electrode, and a plurality of switching elements connected thereto. When a voltage is applied to the field generating electrode, electric field is generated in the liquid crystal layer such that the liquid crystal is rearranged, thereby adjusting the amount of light transmitted to display a desired image. The display panel may include at least one polarizer which is an optical filter that passes through light waves of a specific polarization while blocking light waves of other polarization.

The field generating electrode included in the liquid crystal display includes a pixel electrode which receives a data voltage and a common electrode which receives a common voltage. The pixel electrode may receive a data voltage through a switching element, which may be a transistor.

The above information disclosed in this Background section is only for enhancement of understanding of the background of the inventive concept and therefore it may contain information that does not form the prior art that is already known in this country to a person of ordinary skill in the art.

SUMMARY

The present disclosure is to provide a display device that reduces a threshold voltage change of the transistor included in the display device and improves reliability of the device as a spacer is stably formed.

A display device according to an exemplary embodiment includes: a plurality of transistors disposed on a substrate; a plurality of pixel electrodes electrically connected to the plurality of transistors; a plurality of first color filters, a plurality of second color filters, and a plurality of third color filters disposed between the plurality of transistors and the plurality of pixel electrodes; and a plurality of main spacers and a plurality of sub-spacers disposed on the pixel electrode, wherein the plurality of main spacers and the plurality of sub-spacers are disposed to overlap selected portions of the plurality of first color filters in a plan view, respectively, and not to overlap the plurality of second color filters and the plurality of third color filters in a plan view.

The plurality of first color filters may be red color filters.

A plurality of color filter patterns overlapping at least one of selected portions of the plurality of second color filters and the plurality of third color filters in a plan view may be further included.

The plurality of color filter patterns may overlap a plurality of transistors overlapping the plurality of second color filters and a plurality of transistors overlapping the plurality of third color filters in a plan view.

The plurality of color filter patterns may be disposed between the plurality of second color filters and the substrate and between the plurality of third color filters and the substrate. The plurality of color filter patterns may represent the same color as the plurality of first color filters.

Each of the plurality of transistors may include a first transistor and a second transistor, and each of the plurality of main spacers may be disposed between the first transistor and the second transistor in a plan view.

The each of the plurality of sub-spacers may overlap the first transistor or the second transistor.

The each of the plurality of color filter patterns may simultaneously overlap the first transistor and the second transistor.

The plurality of sub-spacers may include a plurality of first sub-spacers disposed to simultaneously overlap selected portions of the plurality of second color filters and the plurality of third color filters disposed adjacent to each other.

The plurality of sub-spacers may include a plurality of second sub-spacers disposed to overlap one of the selected portions of the plurality of second color filters or the plurality of third color filters and a plurality of data lines disposed adjacent to the one of the selected portions of the plurality of second color filters or the plurality of third color filters A display device according to an exemplary embodiment includes: A display device comprising: a plurality of transistors disposed on a substrate; a plurality of pixel electrodes electrically connected to the plurality of transistors; a plurality of color filters overlapping the plurality of pixel electrodes; and a plurality of main spacers and a plurality of sub-spacers disposed on the plurality of pixel electrodes, wherein the plurality of main spacers and the plurality of sub-spacers overlap selected portions of the plurality of color filters represent the same color.

The plurality of color filter patterns may be connected to the first color filter.

The display device according to an exemplary embodiment may reduce the threshold voltage change of the transistor and improve the reliability of the device through the spacer that is stably disposed.

DETAILED DESCRIPTION OF THE EMBODIMENTS

Figure 1:
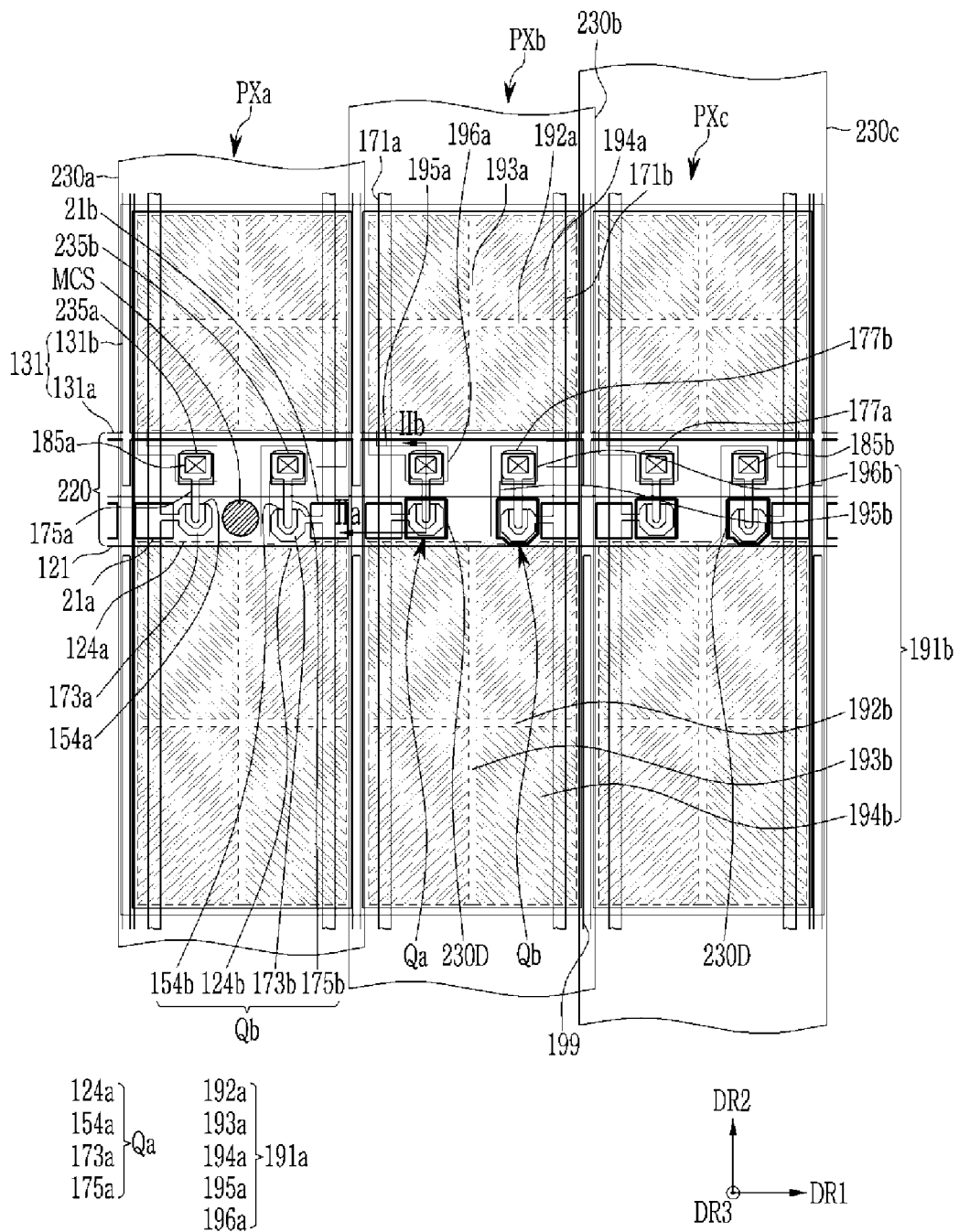
FIG. 1 is a layout view of three adjacent pixels of a display device according to an exemplary embodiment.

The present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

Descriptions of parts not related to the present inventive concept are omitted, and like reference numerals designate like elements throughout the specification.

Further, since sizes and thicknesses of constituent members shown in the accompanying drawings are arbitrarily given for better understanding and ease of description, the present inventive concept is not limited to the illustrated sizes and thicknesses. In the drawings, the thickness of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, in the specification, the phrase "on a plane" means viewing the object portion from the top, and the phrase "on a cross-section" means viewing a cross-section of which the object portion is vertically cut from the side.

Throughout this specification and the claims which follow, a plan view means a view when observing a surface parallel to two directions (e.g., a direction DR1 and a direction DR2) crossing each other, and a cross-sectional view means a view when observing a surface cut in a direction (e.g., a direction DR3) perpendicular to the surface parallel to the direction DR1 and the direction DR2. Also, to overlap two constituent elements means that two constituent elements are overlapped in the direction DR3 (e.g., a direction perpendicular to an upper surface of the substrate) unless stated otherwise.

Now, a display device according to an exemplary embodiment is described with reference to FIG. 1 and FIG. 2. FIG. 1 is a layout view of three adjacent pixel of a display device according to an exemplary embodiment, and FIG. 2 is a cross-sectional view of a display device shown in FIG. 1 taken along a line IIa-IIb.

Figure 2:
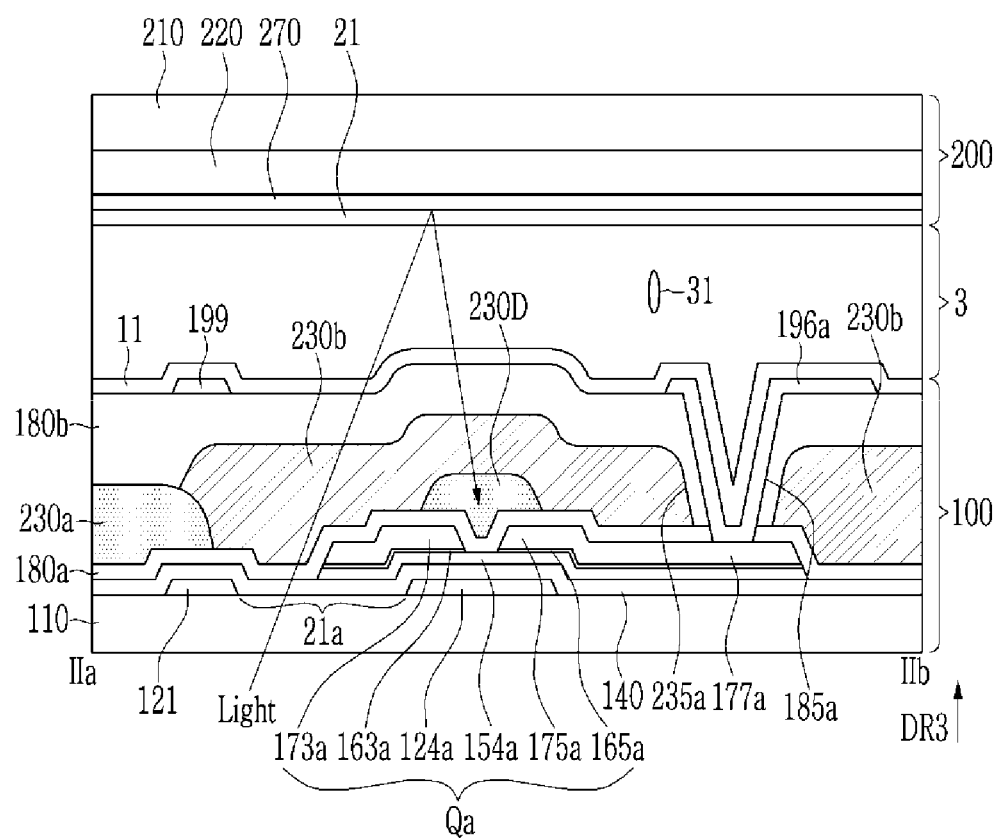
FIG. 2 is a cross-sectional view of a display device shown in FIG. 1 taken along a line IIa-IIb.

Referring to FIG. 1 and FIG. 2, the display device according to an exemplary embodiment includes a display area capable of displaying an image in a plan view, and the display area includes a plurality of pixels PXa, PXb, and PXc. The pixels PXa, PXb, and PXc may be alternately arranged along a first direction DR1.

The display device according to an exemplary embodiment may include a first display panel 100, a second display panel 200 overlapping the first display panel 100, and a liquid crystal layer 3 disposed between the first display panel 100 and the second display panel 200.

The first display panel 100 includes a gate conductive layer (121 and 131) including a gate line 121, a storage electrode line 131, etc. disposed on a first substrate 110 including an insulating material such as glass, plastic, etc.

The gate line 121 may mainly extends in the first direction DR1 and transmit a gate signal. The gate line 121 may include a first gate electrode 124a and a second gate electrode 124b disposed in each pixel PXa, PXb or PXc.

The gate line 121 in each pixel PXa, PXb or PXc may include openings 21a and 21b disposed between the first data line 171a and the second data line 171b. The opening 21a may be disposed between the first data line 171a and the first gate electrode 124a, and the opening 21b may be disposed between the second data line 171b and the second gate electrode 124b. The openings 12a and 12b may be completely surrounded by the gate line 121.

The storage electrode line 131 may include a transverse part 131a extending approximately parallel to the gate line 121, and a longitudinal part 131b connected to the transverse part 131a and extending approximately perpendicular to the gate line 121. The longitudinal part 131b of the storage electrode line 131 may extend along the boundary between two adjacent pixels of PXa, PXb, and PXc.

A gate insulating layer 140 is disposed on the gate conductive layer (121 and 131). The gate insulating layer 140 may include an inorganic insulating material such as a silicon nitride (SiNx), a silicon oxide (SiOx), and a silicon oxynitride (SiON).

A semiconductor layer (154a and 154b) including a first semiconductor layer 154a and a second semiconductor layer 154b is disposed on the gate insulating layer 140. The first semiconductor layer 154a may overlap the first gate electrode 124a, and the second semiconductor layer 154b may overlap the second gate electrode 124b.

The semiconductor layers 154a and 154b may include amorphous silicon, polycrystalline silicon, or a metal oxide.

Ohmic contact layers 163a and 165a may be disposed on the semiconductor layers 154a and 154b. A pair of ohmic contact layers 163a and 165a may be disposed on the first semiconductor layer 154a, and another pair of ohmic contact layers may be disposed on the second semiconductor layer 154b. The ohmic contact layers may be made of materials such as a silicide or n+ hydrogenated amorphous silicon doped with an n-type impurity in high concentrations. The ohmic contact layers 163a and 165a may be omitted.

On the ohmic contact layers 163a and 165a, a data conductive layer (171a, 171b, 175a, and 175b) including a plurality of data lines 171a and 171b including a first data line 171a and a second data line 171b, a plurality of first drain electrodes 175a, and a plurality of second drain electrodes 175b is disposed.

The first data line 171a and the second data line 171b transmit a data signal, and may mainly extend in the second direction DR2 to intersect the transverse part 131a of the storage electrode line 131 and the gate line 121.

The first data line 171a and the second data line 171b corresponding to each of the pixels PXa, PXb, and PXc may transmit the data voltages representing different luminances for one pixel which display a same image signal, respectively. For example, the data voltage transmitted by the second data line 171b may be lower than the data voltage transmitted by the first data line 171a for the same image signal of one pixel. The first and second data lines 171a and 171b respectively disposed in adjacent pixels PXa, PXb, and PXc may transmit data voltages for different image signals.

The first data line 171a may include a first source electrode 173a overlapping the first gate electrode 124a, and the second data line 171b may include a second source electrode 173b overlapping the second gate electrode 124b.

The first drain electrode 175a and the second drain electrode 175b may include a rod-shaped end portion and a pad portions 177a and 177b, respectively. The pad portions 177a and 177b of the first drain electrode 175a and the second drain electrode 175b may be disposed between the storage electrode line 131 and the gate line 121.

The rod-shaped end portions of the first drain electrode 175a and the second drain electrode 175b may be partially surrounded by the first source electrode 173a and the second source electrode 173b, respectively.

The first gate electrode 124a, the first source electrode 173a, and the first drain electrode 175a together form a first transistor Qa along with the first semiconductor layer 154a, and the second gate electrode 124b, the second source electrode 173b, and the second drain electrode 175b together form a second transistor Qb along with the second semiconductor layer 154b. Channels of the first and second transistors Qa and Qb may be disposed in the first semiconductor layer 154a between the first source electrode 173a and the first drain electrode 175a and the second semiconductor layer 154b disposed between the second source electrode 173b and the second drain electrode 175b, facing each other.

The first and second transistors Qa and Qb disposed in each pixel PXa, PXb, and PXc may be disposed in the extending direction of the gate line 121, that is, the first direction DR1. Also, in a plan view, the first and second transistors Qa and Qb may be disposed between the first data line 171a and the second data line 171b corresponding to each pixel PXa, PXb, and PXc.

The first and second transistors Qa and Qb may function as switching elements that transfer the data voltages transmitted by the first and second data lines 171a and 171b according to the gate signal transmitted by the gate line 121.

Referring to FIG. 1 and FIG. 2, the region where the gate line 121, the transverse part 131a of the storage electrode line 131, and the first and second transistors Qa and Qb are disposed may be covered by the light blocking member 220. The light blocking member 220 may mainly extend in the first direction DR1 to form a light blocking region of each pixel PXa, PXb, and PXc.

A first insulating layer 180a is disposed on the data conductive layer (171a, 171b, 175a, and 175b). The first insulating layer 180a may include an organic insulating material or an inorganic insulating material.

A plurality of color filters 230a, 230b, and 230c and a color filter pattern 230D may be disposed on the first insulating layer 180a.

Each color filter 230a, 230b, and 230c may display one of primary colors such as three primary colors of red, green, and blue or four primary colors. The color filters 230a, 230b, and 230c are not limited to the three primary colors of red, green, and blue, and may display primary colors of cyan, magenta, yellow, and white colors. For example, the color filter 230a may represent red, the color filter 230b may represent green, and the color filter 230c may represent blue, but colors of the color filters are not limited thereto.

The first color filter 230a may be disposed corresponding to the first pixel PXa, the second color filter 230b may be disposed corresponding to the second pixel PXb, and the third color filter 230c may be disposed corresponding to the third pixel PXc. In other words, the first color filter 230a may overlap the first pixel PXa, the second color filter 230b may overlap the second pixel PXb, and the third color filter 230c may overlap the third pixel PXc. Each color filter 230a, 230b, and 230c may extend and be elongated in the second direction DR2 to correspond to a plurality of pixels disposed in one column. A group of the color filters including three color filters 230a, 230b, and 230c may be repeatedly disposed in the first direction DR1. That is, the three color filters 230a, 230b, and 230c may be alternately disposed along the first direction DR1.

Two of the color filters 230a, 230b, and 230c corresponding to two of adjacent pixels PXa, PXb, and PXc at the boundary between two of adjacent pixels PXa, PXb, and PXc may overlap each other in the third direction DR3 on the first substrate 110. For example, the color filter 230a of the first pixel PXa may overlap the color filter 230b of the adjacent second pixel PXb at the boundary between two adjacent pixels PXa and PXb. The overlapping portions of the two color filters 230a and 230b overlapping each other may overlap the longitudinal part 131b of the storage electrode line 131.

Two of the color filters 230a, 230b, and 230c overlapping each other between two adjacent pixels of PXa, PXb, and PXc may have a light blocking function to prevent light leakage between two of the adjacent pixels PXa, PXb, and PXc.

Each color filter 230a, 230b, and 230c may include openings 235a and 235b overlapping the pad portions 177a and 177b of the first and second drain electrodes 175a and 175b, respectively.

The color filter pattern 230D represents the same color, is disposed on the same layer, contains the same material, and may be formed simultaneously in the same process as the first color filter 230a. For example, the color filter pattern 230D may represent red, but the color of the color filter pattern 230D is not limited thereto, and when the first color filter 230a is the green color filter, the color filter pattern 230D may represent green, and when the first color filter 230a is the blue color filter, the filter pattern 230D may represent blue.

The color filter pattern 230D is spaced apart from the first color filter 230a or the first pixel PXa, which represents the same color as the color filter pattern 230D, and the color filter pattern 230D may be disposed in the second and third pixels PXb and PXc in which the second and third color filters 230b and 230c representing different colors from the first color filter 230a are formed.

The color filter pattern 230D disposed in the second and third pixels PXb and PXc may overlap the first and second transistors Qa and Qb, respectively. In detail, the color filter pattern 230D disposed in each of the second pixel PXb and the third pixel PXc may overlap the channels of the first and second semiconductor layers 154a and 154b of the first and second transistors Qa and Qb, respectively.

According to an exemplary embodiment, two color filter patterns 230D may be disposed at each pixel PXb and PXc.

The number of color filter patterns 230D included in each pixel PXb and PXc may vary according to the number of transistors included in each pixel PXb and PXc.

The color filter pattern 230D may have an island shape overlapping the transistor in a plan view, but the shape of the color filter pattern 230D is not limited thereto, and may have any shape for overlapping with the channel of the transistor.

Each color filter pattern 230D together with a color filter disposed below it may absorb most of the light incident onto the channel of the first and second transistors Qa and Qb to prevent the light from reaching the first and second transistors Qa and Qb. Accordingly, photo current caused by an external light may be prevented, thus an initial threshold voltage of the first and second transistors Qa and Qb may be improved, a deviation of threshold voltage may be reduced, and, as a result, the reliability may be improved by reducing the color change of the display device.

In a cross-sectional view, the color filter pattern 230D may be disposed between the second and third color filters 230b and 230c and the substrate 110, in detail, between the second and third color filters 230b and 230c and the first insulating layer 180a. In a plan view, the color filter pattern 230D may overlap the region where the light blocking member 220 is disposed. In addition, each color filter pattern 230D may be disposed between the first data line 171a and the second data line 171b corresponding to each pixel PXb and PXc.

The opening 21a of the gate line 121 may overlap a portion of the first data line 171a and the first source electrode 173a, and the opening 21b of the gate line 121 may overlap a portion of the second data line 171b and the second source electrode 173b. When the pixel is defective, a laser is irradiated to the first source electrode 173a and/or second source electrode 173b through the openings 21a and 21b to cut the first transistor Qa and/or the second transistor Qb from the first data line 171a and/or the second data line 171b, thereby repairing the defective pixel.

The color filter pattern 230D may be disposed not to overlap the openings 21a and 21b. Therefore, because only one color filter 230a, 230b, or 230c is disposed on the opening 21a and 21b of each pixel PXa, PXb or PXc, display defects such as a black spot generated due to the laser irradiation for two or more color filters is minimized when repairing defective pixels.

A second insulating layer 180b may be disposed on the color filters 230a, 230b, and 230c and the color filter pattern 230D. The second insulating layer 180b may include an inorganic insulating material or an organic insulating material. According to an exemplary embodiment, the second insulating layer 180b may include the organic insulating material to provide an almost flat top surface. The second insulating layer 180b acts as an overcoat for the color filters 230a, 230b, and 230c and the color filter pattern 230D to prevent the color filters 230a, 230b, and 230c and the color filter pattern 230D from being exposed, and to prevent an impurity of pigments from inflowing into the liquid crystal layer 3.

The first insulating layer 180a and the second insulating layer 180b include a contact hole 185a disposed on the pad portion 177a of the first drain electrode 175a and a contact hole 185b disposed on the pad portion 177b of the second drain electrode 175b.

A pixel electrode layer (191a, 191b, and 199) including a plurality of first sub-pixel electrodes 191a and a plurality of second sub-pixel electrodes 191b as well as a shielding electrode 199 may be disposed on the second insulating layer 180b. For each pixel PXa, PXb or PXc, the first sub-pixel electrode 191a may be disposed on one side and the second sub-pixel electrode 191b may be disposed on the opposite side of a transistor forming region on which the first and second transistors Qa and Qb are disposed.

The overall shape of each of the first sub-pixel electrode 191a and the second sub-pixel electrode 191b may be quadrangular. The first sub-pixel electrode 191a may include a cross-shaped stem portion including a transverse stem portion 192a and a longitudinal stem portion 193a, and a plurality of branch portions 194a extending outward from the cross-shaped stem portion. The second sub-pixel electrode 191b may include a cross-shaped stem portion including a transverse stem portion 192b and a longitudinal stem portion 193b, and a plurality of branch portions 194b extending outward from the cross-shaped stem portion.

The size of the first sub-pixel electrode 191a may be smaller than the size of the second sub-pixel electrode 191b in a plan view.

The first sub-pixel electrode 191a may include an extension 195a protruded toward the pad portion 177a of the first drain electrode 175a and a contact portion 196a connected to an end of the extension 195a. The second sub-pixel electrode 191b may include an extension 195b protruded toward the pad portion 177b of the second drain electrode 175b and a contact portion 196b connected to the end of the extension 195b. The contact portion 196a is electrically connected to the pad portion 177a of first drain electrode 175a through the contact hole 185a. The contact portion 196b is electrically connected to the pad portion 177b of the second drain electrode 175b through the contact hole 185b.

When the first transistor Qa and the second transistor Qb are turned on, the first sub-pixel electrode 191a and the second sub-pixel electrode 191b may receive data voltages from the first drain electrode 175a and the second drain electrode 175b, respectively.

The shielding electrode 199 may include a transverse part extending in the first direction DR1 and a longitudinal part extending in the second direction DR2. The shielding electrode 199 may be disposed between the pixels PXa, PXb, and PXc adjacent along the first direction DR1 and/or between the pixels PXa, PXb, and PXc adjacent in the second direction DR2. The shielding electrode 199 prevents coupling and the light leakage between the adjacent pixels PXa, PXb, and PXc. The longitudinal part of the shielding electrode 199 may overlap the longitudinal part 131b of the storage electrode line 131.

The pixel electrode layer (191a, 191b, and 199) may include a transparent conductive material such as indium tin oxide (ITO), indium zinc oxide (IZO), or a metal thin film.

The arrangement, the shape, and the structure of the transistor and the shape of the pixel electrode described in this embodiment are just exemplary, and various modifications are possible.

Spacers MCS and SCS may be disposed on the pixel electrode layer (191a, 191b, and 199) and the second insulating layer 180b. The spacers MCS and SCS are described in detail with reference to FIG. 3 to FIG. 6.

A first alignment layer 11 may be disposed on the pixel electrode layer (191a, 191b, and 199) and the second insulating layer 180b. The first alignment layer 11 may be a vertical alignment layer as an example. The first alignment layer 11 may be a photoalignment layer including a photoreactive material.

Next, the second display panel 200 may be disposed on the first display panel 100. The second display panel 200 may include a light blocking member 220 disposed between a second substrate 210 including insulating materials such as glass and plastic, and the liquid crystal layer 3. As described above, the light blocking member 220 may include a portion extending in the first direction DR1 and overlapping the transistor forming region on which the first and second transistors Qa and Qb are disposed. However, it is not limited thereto, and according to another exemplary embodiment, the light blocking member 220 may be disposed on the first display panel 100 instead of the second display panel 200.

A common electrode 270 may be disposed between the light blocking member 220 and the liquid crystal layer 3. The common electrode 270 may be formed as a plate shape on the entire surface of the second substrate 210. That is, the common electrode 270 may have no removed portion such as a slit. The common electrode 270 may transmit a common voltage Vcom having a predetermined voltage.

The common electrode 270 may include a transparent conductive material such as ITO, IZO, or a metal thin film.

A second alignment layer 21 may be disposed between the common electrode 270 and the liquid crystal layer 3. The second alignment layer 21 may be a vertical alignment layer. The second alignment layer 21 may be a photoalignment layer including the photoreactive material.

The liquid crystal layer 3 includes a plurality of liquid crystal molecules 31. The liquid crystal molecules 31 may have negative dielectric anisotropy and may be oriented in a direction substantially perpendicular to the first and second substrates 110 and 210 with no electric field generated in the liquid crystal layer 3. The liquid crystal molecules 31 may be pretilted in a predetermined direction when no electric field is generated in the liquid crystal layer 3. For example, the liquid crystal molecules 31 may be inclined with a pretilted angle in a direction substantially parallel to the branch portions 194a and 194b of the first and second sub-pixel electrodes 191a and 191b.

A backlight that provides light may be disposed below or behind the first display panel 100. As shown in FIG. 2, when light of the backlight passes through between the gate conductive layer and the data conductive layer, is reflected at a surface of the common electrode 270 of the second display panel 200, and then is again incident toward the first transistor Qa or the second transistor Qb of the first display panel 100, most of the light is absorbed in the color filter pattern 230D not to reach the first transistor Qa or the second transistor Qb, thereby increasing the reliability of the display device as above-described.

Figure 3:
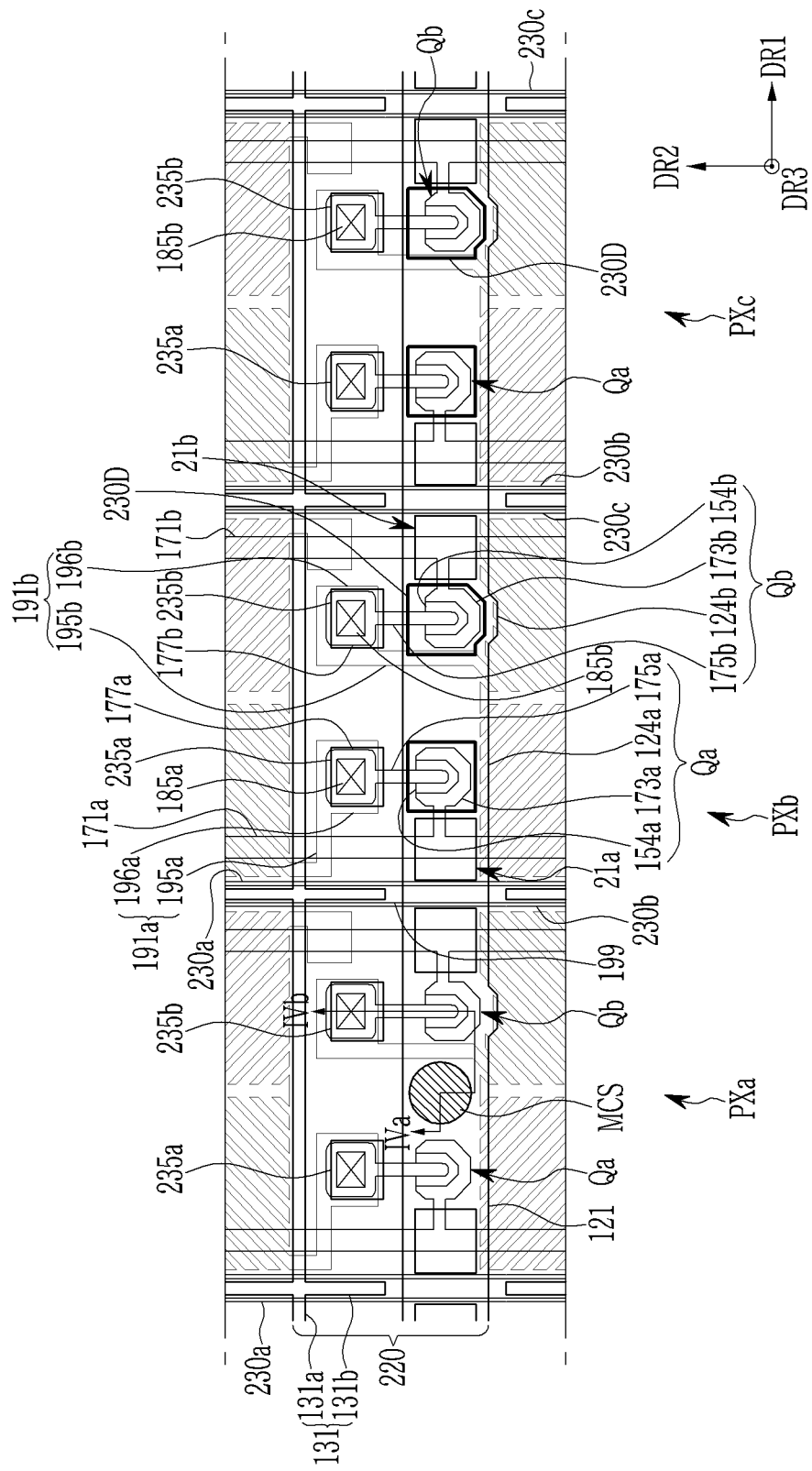
FIG. 3 is a layout view of a part of three adjacent pixels of a display device according to an exemplary embodiment.
Figure 5:
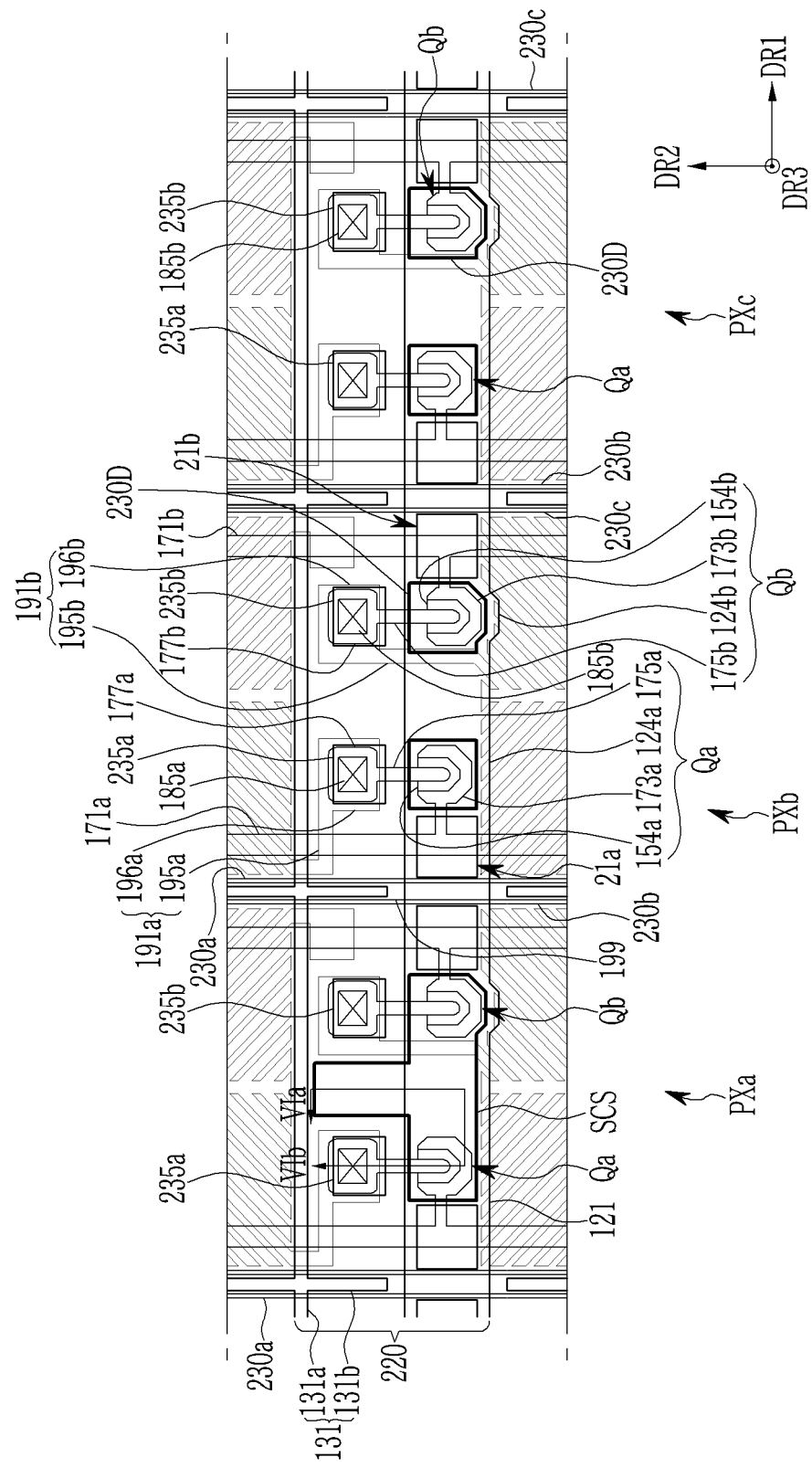
FIG. 5 is a layout view of another part of three adjacent pixels of a display device according to an exemplary embodiment.
Figure 6:
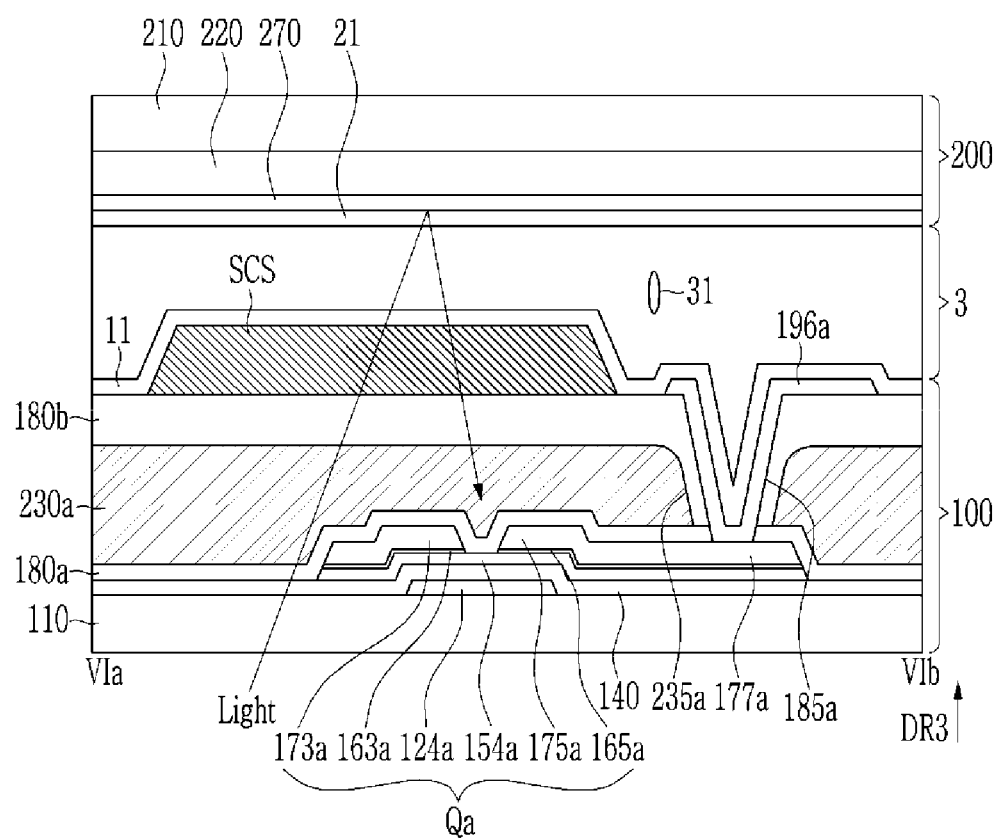
FIG. 6 is a cross-sectional view of a display device shown in FIG. 5 taken along a line VIa-VIb.

Next, the display device according to an exemplary embodiment is described with reference to FIG. 3 to FIG. 6. FIG. 3 is a layout view of a part of three adjacent pixels of a display device according to an exemplary embodiment, FIG. 4 is a cross-sectional view of a display device shown in FIG. 3 taken along a line IVa-IVb, FIG. 5 is a layout view of another part of three adjacent pixels of a display device according to an exemplary embodiment, and FIG. 6 is a cross-sectional view of a display device shown in FIG. 5 taken along a line VIa-VIb.

Figure 4:
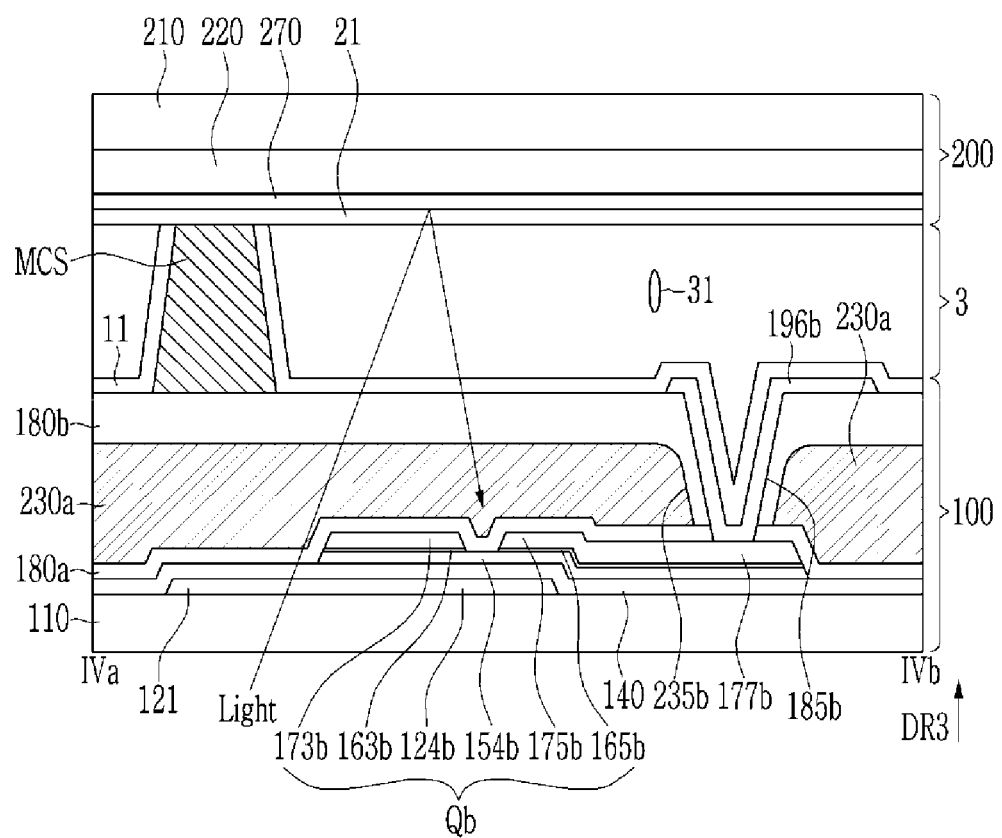
FIG. 4 is a cross-sectional view of a display device shown in FIG. 3 taken along a line IVa-IVb.

First, referring to FIG. 3 and FIG. 4, the display device according to an exemplary embodiment may include a main spacer MCS disposed on the first pixel PXa. In other words, the display device may include the main spacer MCS overlapping the first color filter 230a. The main spacer MCS may be placed on a flat surface of the first color filter 230a. The main spacers MCS does not overlap the second pixel PXb and/or the third pixel PXc, and may be spaced apart from each other. That is, the main spacer MCS may be disposed not to overlap the second color filter 230b and/or the third color filter 230c. The main spacer MCS may also not overlap the color filter pattern 230D located at the second pixel PXb and the third pixel PXc.

The main spacer MCS may maintain a gap between the first display panel 100 and the second display panel 200 in a normal unpressurized state. The main spacer MCS need not be disposed on every first pixel PXa, and may be disposed on some of the plurality of first pixels PXa.

The main spacer MCS, as shown in FIG. 3, may be disposed between the first transistor Qa and the second transistor Qb in a plan view. However, it is not limited to this position, and it may be disposed at any position. In addition, the present specification shows an exemplary embodiment in which the main spacer MCS has a circular shape in a plan view, but it is not limited thereto, and the main spacer MCS may have various shapes.

Next, referring to FIG. 5 and FIG. 6, the display device according to an exemplary embodiment may include a sub-spacer SCS disposed in the first pixel PXa. In other words, the sub-spacer SCS may overlap the first color filter 230a. The sub-spacer SCS may be disposed on a flat surface of the first color filter 230a. The sub-spacer SCS does not overlap the second pixel PXb and/or the third pixel PXc, and may be spaced apart each other. That is, the sub-spacer SCS may be disposed not to overlap the second color filter 230b and/or the third color filter 230c. The sub-spacer SCS may not overlap the color filter pattern 230D disposed at the second pixel PXb and the third pixel PXc.

The sub-spacer SCS may maintain the gap between the first display panel 100 and the second display panel 200 under a pressed state. The height of the main spacer MCS and the sub-spacer SCS may be different.

The height of the main spacer MCS may be greater than the height of the sub-spacer SCS. The sub-spacer SCS also does not need to be disposed on every first pixel PXa, and may be disposed on some of the plurality of first pixels PXa.

In a plan view, the sub-spacer SCS may overlap the first transistor Qa and the second transistor Qb. The sub-spacer SCS may have a rectangular shape overlapping the first transistor Qa and the second transistor Qb in a plan view, and may have a protruded portion that is protruded toward a space disposed between the first contact hole 185a and the second contact hole 185b. However, the sub-spacer SCS is not limited to this form, and may be modified in various forms.

The display device according to an exemplary embodiment may include the main spacer MCS and the sub-spacer SCS disposed at the first pixel PXa. The main spacer MCS and sub-spacer SCS may both be disposed on pixels representing the same color. The main spacer MCS and sub-spacer SCS may both be disposed at the first pixel PXa as an example, and may not overlap the second pixel PXb or the third pixel PXc. The main spacer MCS and the sub-spacer SCS may both overlap the first color filter 230a, and may be disposed to overlap the color filter representing red according to an exemplary embodiment. In other words, the main spacer MCS and the sub-spacer SCS may not overlap the second color filter 230b or the third color filter 230c.

However, the present inventive concept is not limited thereto, and when the first pixel PXa represents green, the main spacer MCS and the sub-spacer SCS may overlap the color filter representing green and not to overlap the color filters representing red and blue, and when the first pixel PXa represents blue, the main spacer MCS and the sub-spacer SCS may overlap the color filter representing blue and not to overlap the color filters representing red and green.

According to the exemplary embodiment described in FIG. 1 and FIG. 2 above, the second pixel PXb and the third pixel PXc may include the color filter pattern 230D. Accordingly, the second and third color filters 230b and 230c and the second insulating layer 180b may have a step region where the color filter pattern D is disposed. If the main spacer MCS is disposed in the second pixel PXb and the third pixel PXc, the main spacer MCS may be disposed to overlap the step region. The main spacer MCS disposed to overlap the step region may have difficulty in maintaining the stable interval between the first display panel 100 and the second display panel 200.

As shown in FIG. 6, the sub-spacer SCS may be spaced apart from the second display panel 200 to have a predetermined gap. When the sub-spacer SCS is disposed in the second pixel PXb and the third pixel PXc having the step region to overlap the step region, the interval from the sub-spacer SCS to the second display panel 200 may be varied depending on the position. In this case, it may also be difficult to maintain the interval between the first display panel 100 and the second display panel 200 through the sub-spacer SCS under pressure.

However, when the main spacer MCS and the sub-spacer SCS are disposed only in the first pixel PXa like an exemplary embodiment, the main spacer MCS and sub-spacer SCS may be disposed in the flat region provided by the first color filter 230a while not being overlapped with a separate color filter pattern 230D. Therefore, the main spacer MCS and the sub-spacer SCS may be stably formed without an additional step, thereby improving the reliability of the display device.

Figure 7:
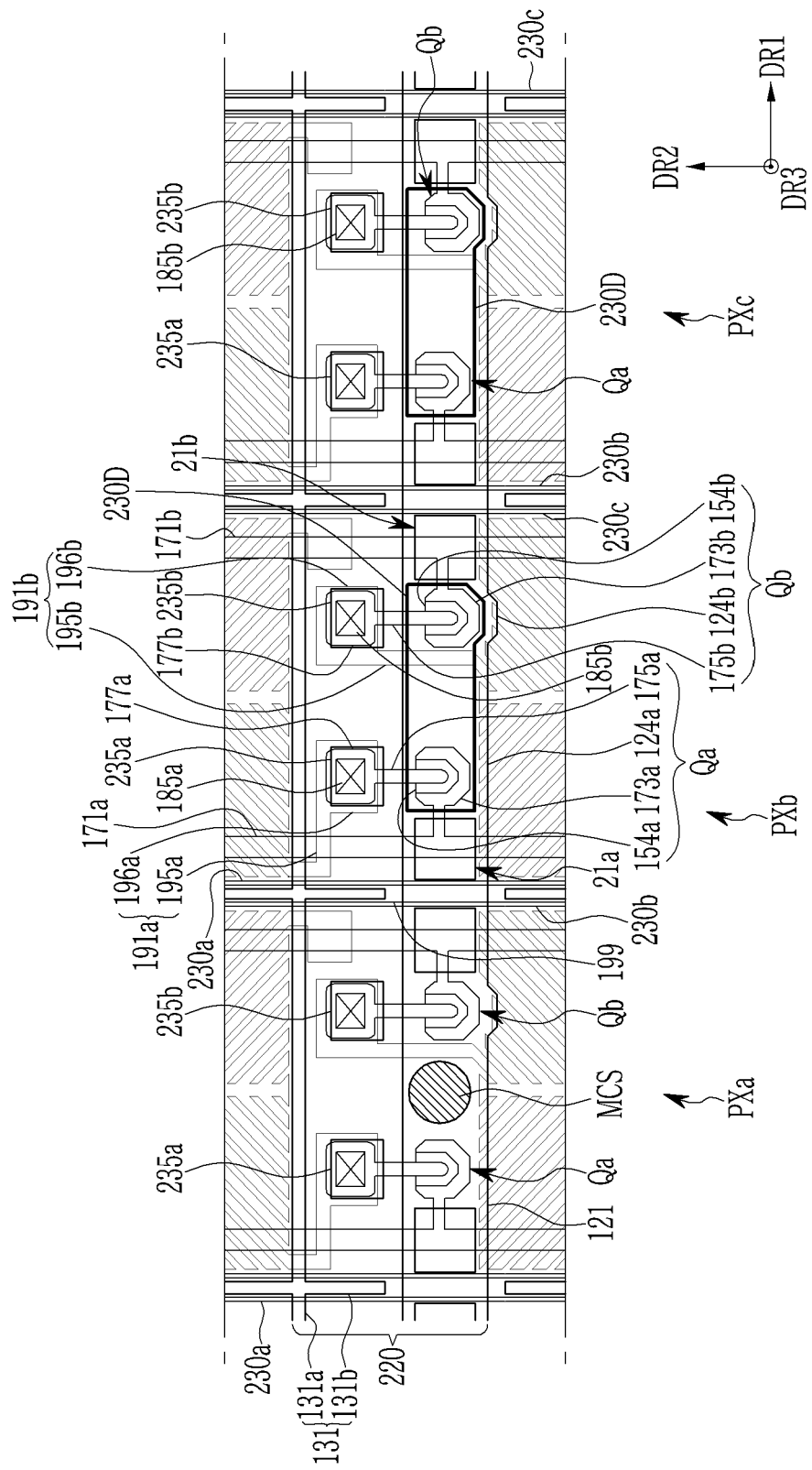
FIG. 7 and FIG. 8 are layout views of a part of three adjacent pixels of a display device according to an exemplary embodiment, respectively.
Figure 8:
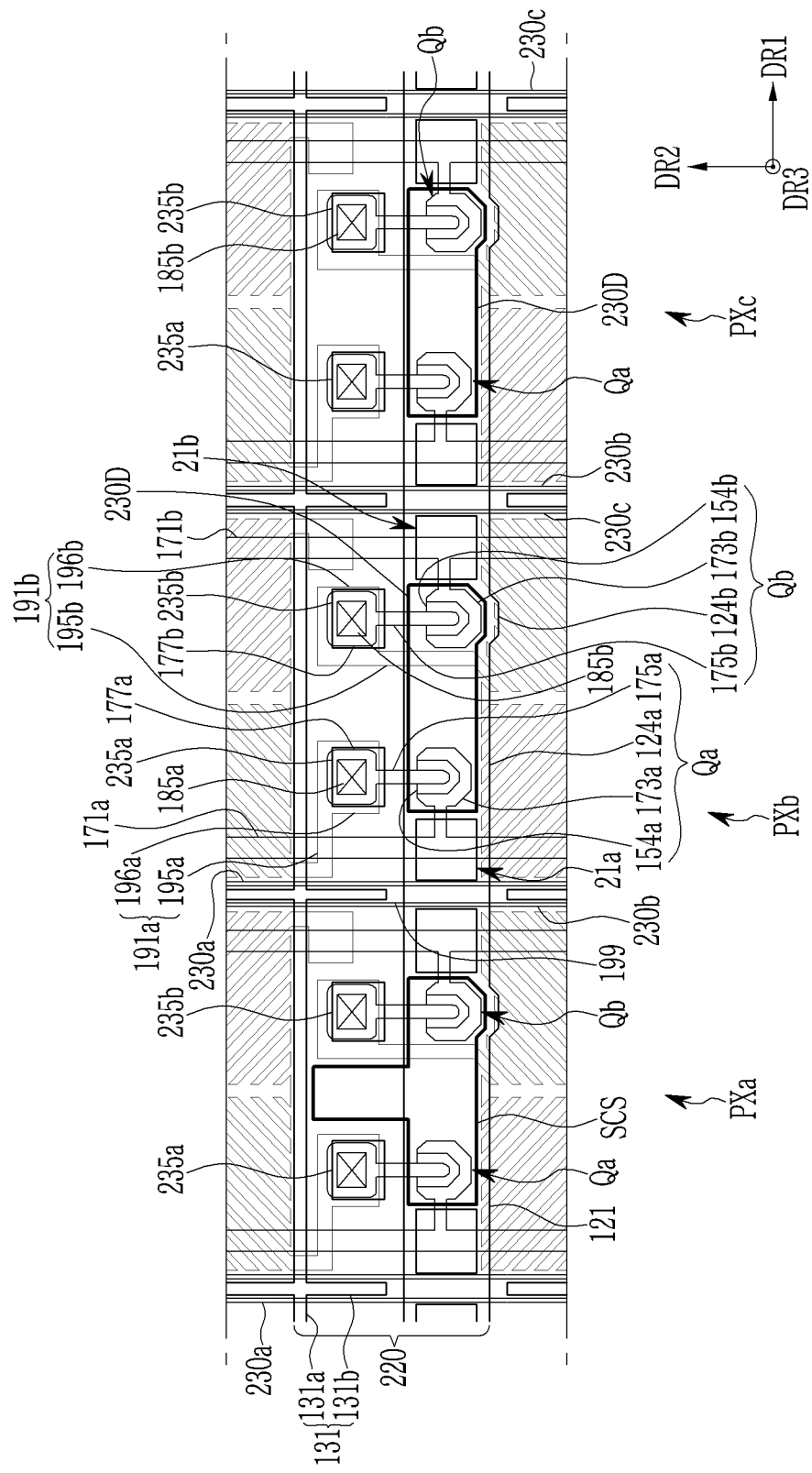

Next, the display device according to an exemplary embodiment is described with reference to FIG. 7 and FIG. 8. FIG. 7 and FIG. 8 are layout views of a part of three adjacent pixels of a display device according to an exemplary embodiment, respectively. The description of the same constituent elements as the above-described constituent elements is omitted.

Referring to FIG. 7 and FIG. 8, the color filter pattern 230D according to an exemplary embodiment may overlap the second pixel PXb and the third pixel PXc. In this case, the color filter pattern 230D overlapping the second pixel PXb and the third pixel PXc may simultaneously overlap the first transistor Qa and the second transistor Qb, and a space disposed between the first transistor Qa and the second transistor Qb. The color filter pattern 230D may have the shape extending along the first direction DR1 to overlap both of the first transistor Qa and the second transistor Qb, and a space disposed between the first transistor Qa and the second transistor Qb.

According to an exemplary embodiment, a length in the first direction DR1 of each color filter pattern 230D may be longer than the length in the second direction DR2. The length in the first direction DR1 of each color filter pattern 230D may be greater than approximately 30 micrometers.

As above-described, the color filter pattern 230D disposed in each pixel PXb and PXc and blocking the light incident to the transistor is formed of a single pattern overlapping all of the plurality of transistors Qa and Qb, and a space disposed between the first transistor Qa and the second transistor Qb of each pixel PXb and PXc such that the color filter pattern 230D may extend along a first direction DR1, thereby the uniformity of the size of the color filter pattern 230D may be effectively managed in the manufacturing process of the display device. In addition, because only one color filter pattern 230D is formed for the plurality of transistors Qa and Qb in each pixel PXb and PXc, a peeling of the color filter pattern 230D may be lowered.

Figure 9:
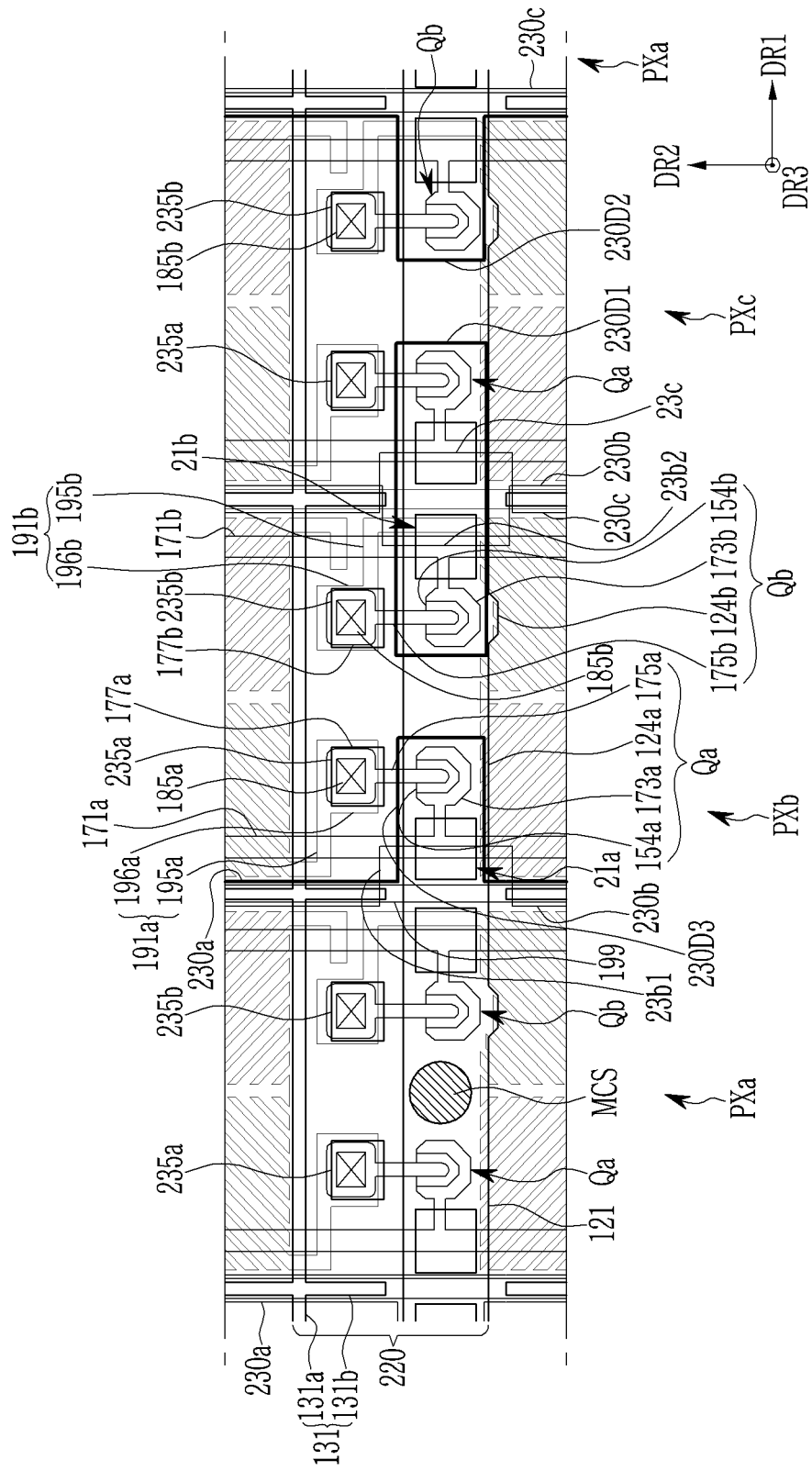
FIG. 9 and FIG. 10 are layout views of a part of three adjacent pixels of a display device according to an exemplary embodiment, respectively.
Figure 10:
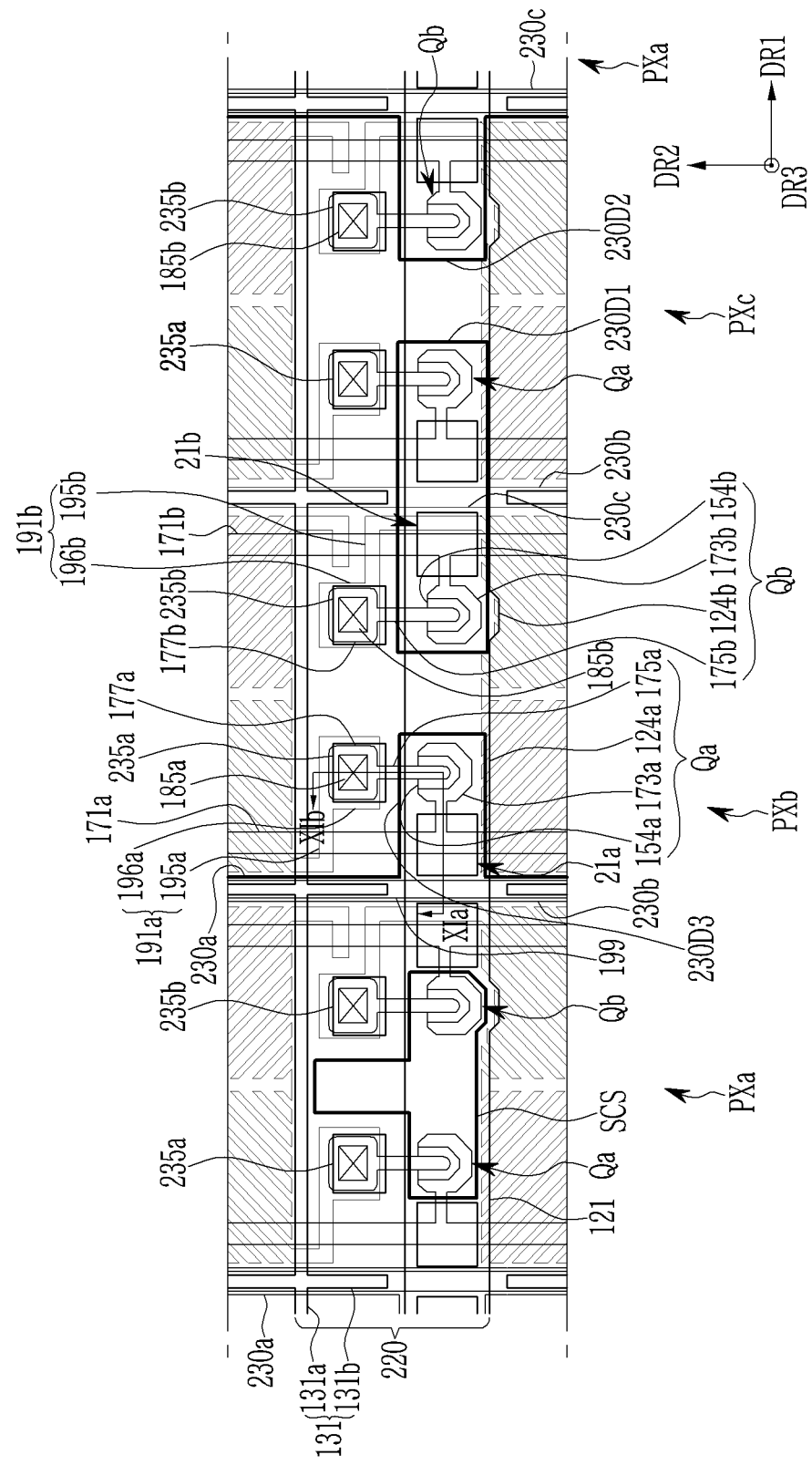
Figure 11:
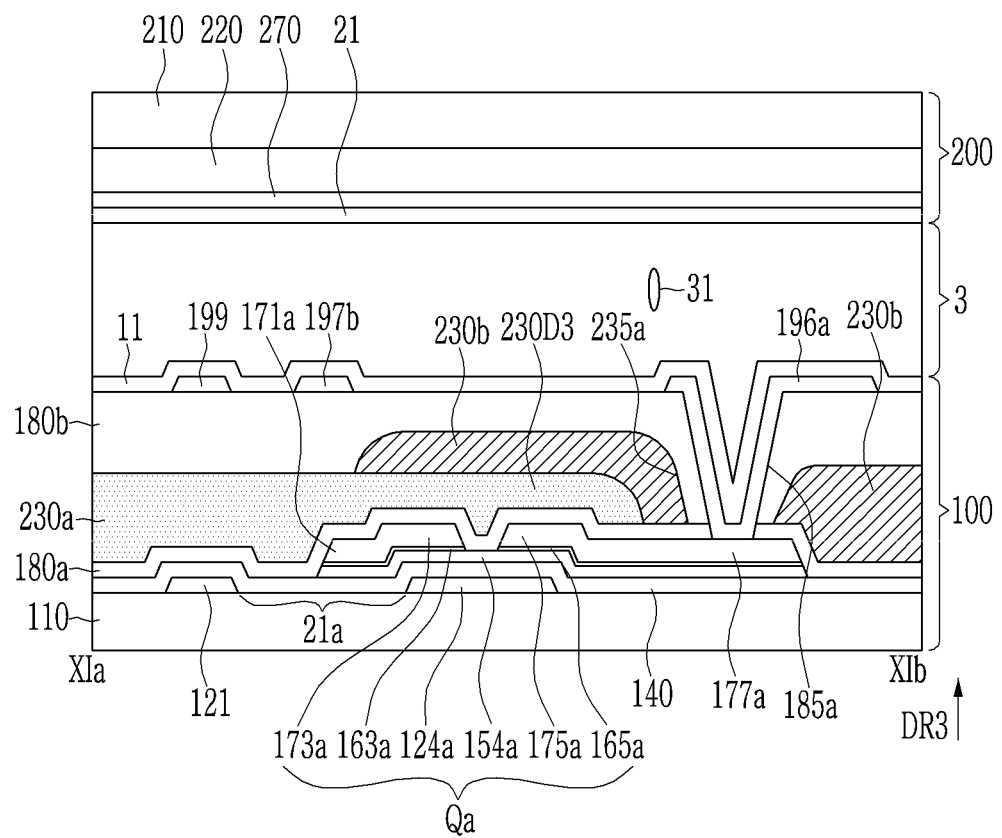
FIG. 11 is a cross-sectional view taken along a line XIa-XIb of FIG. 10.

Next, the display device according to an exemplary embodiment is described with reference to FIG. 9 to FIG. 11. FIG. 9 and FIG. 10 are layout views of a part of three adjacent pixels of a display device according to an exemplary embodiment, respectively, and FIG. 11 is a cross-sectional view taken along a line XIa-XIb of FIG. 10. The description of the same constituent elements as the above-described constituent elements is omitted.

Referring to FIG. 9 to FIG. 11, the display device according to the present exemplary embodiment is the same as most of the display device shown in FIG. 7 to FIG. 8 described above, however the structure of the plurality of color filters 230a, 230b, and 230c may be different, and color filter patterns 230D1, 230D2, and 230D3 that are disposed on the same layer as the color filter pattern 230D but have a different structure from the color filter pattern 230D may be disposed.

The first color filter pattern 230D1, which is disposed on the same layer as the first color filter 230a overlapping the first pixel PXa and represents the same color, is spaced apart from the first color filter 230a or the first pixel PXa, and may be formed continuously over the two adjacent pixels PXb and PXc.

In detail, the color filter pattern 230D1 may overlap both the second transistor Qb positioned on the right side of the second pixel PXb and the first transistor Qa positioned on the left side of the third pixel PXc. Particularly, the first color filter pattern 230D1 may overlap all of the channels of the semiconductor layers 154a and 154b of the first transistor Qa disposed on the left side of the third pixel PXc and the second transistor Qb disposed on the right side of the second pixel PXb. The first transistor Qa and the second transistor Qb of two pixels PXb and PXc overlapping one single color filter pattern 230D1 may be generally arranged in the first direction DR1.

The first color filter pattern 230D1 may overlap the second data line 171b electrically connected to the second transistor Qb disposed on the right side of the second pixel PXb and the first data line 171a electrically connected to the first transistor Qa disposed on the left side of the third pixel PXc.

The second color filter pattern 230D2, which is disposed on the same layer as the first color filter 230a and may display the same color, is connected to the left portion of the first color filter 230a and may overlap the second transistor Qb of the third pixel PXc adjacent to the first pixel PXa. Specifically, the second color filter pattern 230D2 may overlap the channel of the second semiconductor layer 154b of the second transistor Qb of the third pixel PXc.

The third color filter pattern 230D3, which is disposed on the same layer as the first color filter 230a and may represent the same color, is connected to the right portion of the first color filter 230a and may overlap the first transistor Qa of the second pixel PXb adjacent to the first pixel PXa. Particularly, the third color filter pattern 230D3 may overlap the channel of the first semiconductor layer 154a of the first transistor Qa of the second pixel PXb.

That is, the second color filter pattern 230D2 and the third color filter pattern 230D3 may be protruded from the first color filter 230a without being separated from the first color filter 230a. Accordingly, only one first color filter patterns 230D1 may exist in three adjacent pixels PXa, PXb, and PXc as an island shaped color filter pattern which is separated from the first color filter 230a. The length of the first direction DR1 of the first color filter pattern 230D1 may be longer than the length of the second direction DR2, and the length of the first direction DR1 of the first color filter pattern 230D1 may be greater than approximately 30 micrometers.

As such, because there is only one first color filter pattern 230D1 which has an island shaped for three adjacent pixels PXa, PXb, and PXc, and the size of the color filter pattern 230D may be enlarged, the uniformity of the size of the color filter pattern 230D may be effectively managed in the manufacturing process of the display device, and the peeling of the color filter patterns 230D1, 230D2, and 230D3 may be reduced.

Like the color filter pattern 230D described above, the color filter patterns 230D1, 230D2, and 230D3 together with the color filter disposed below the color filter patterns 230D1, 230D2, and 230D3 also absorb most of the light incident onto the channel of the first and second transistors Qa and Qb from the top, thereby the light incident toward the channel of the first and second transistors Qa and Qb from the top may not reach the first and second transistors Qa and Qb. As a result, photo current caused by an external light may be prevented, thus an initial threshold voltage of the first and second transistors Qa and Qb may be improved, a deviation of the threshold voltage may be reduced, and, as a result, the reliability of the display device may be increased by reducing the color change of the display device.

The first to third color filter patterns 230D1, 230D2, and 230D3 may be disposed to overlap the light blocking member 220 in a plan view.

In FIG. 9, different from FIG. 10, the second color filter 230b and the third color filter 230c have respective color filter patterns 23b1, 23b2, and 23c.

The second color filter 230b has two color filter patterns 23b1 and 23b2. The color filter pattern 23b1 is a recessed portion of the second color filter 230b in the first direction DR1. The color filter pattern 23b2 is a recessed portion of the second color filter 230b in the opposite direction of the first direction DR1.

The third color filter 230c also has a color filter pattern 23c, and the color filter pattern 23c is a recessed portion of the third color filter 230c in the first direction DR1.

Figure 12:
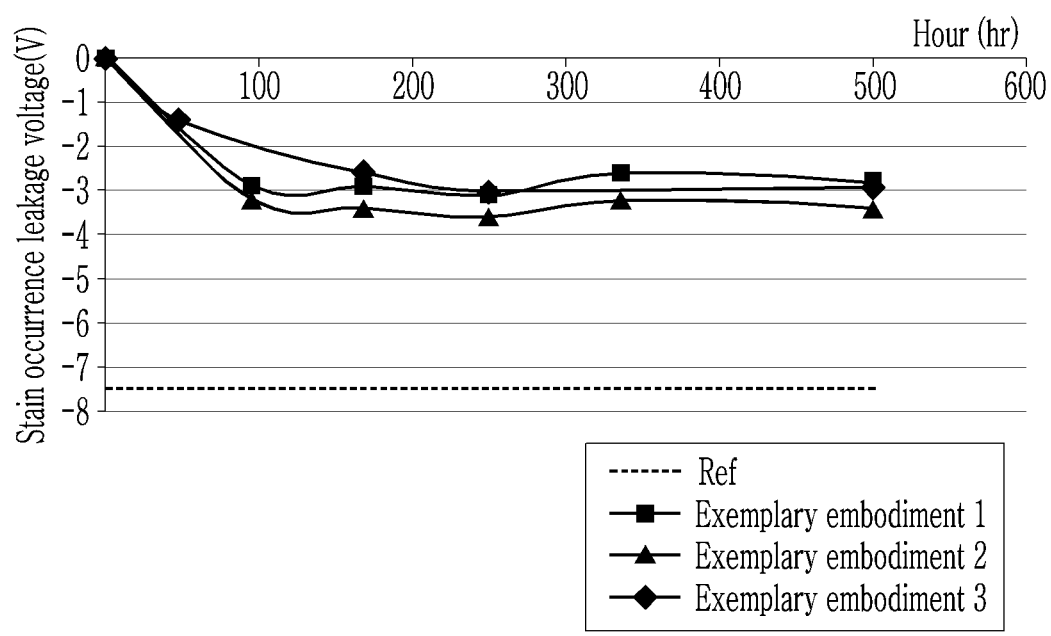
FIG. 12 is a graph showing a stain occurrence leakage voltage according to the exemplary embodiment.

Next, the effect of the display device according to an exemplary embodiment is described with reference to FIG. 12. FIG. 12 is a graph showing a stain occurrence leakage voltage according to the exemplary embodiment.

FIG. 12 is a graph illustrating a variation degree of a stain occurrence leakage voltage of the display device according to Exemplary Embodiments 1 to 3 as time passes up to about 500 hours. In the case of Exemplary Embodiments 1 to 3 in which the color filter pattern overlaps each second color filter and third color filter, it is confirmed that the stain occurrence leakage voltage is about −3.9 V after 500 hours when a backlight unit is 870,000 nit. It is confirmed that there is a voltage margin of about 3.6 V to a reference value (Ref) at which the stain is recognized.

In a case of the display device without the color filter pattern according to a comparative example, the stain occurrence leakage voltage is about −4.5 V after 500 hours when a backlight unit is 870,000 nit. It is confirmed that there is a voltage margin of about 3 V to the reference value (Ref) at which the stain is recognized.

The occurrence of the stain is a case where it is recognized that the luminance is bright compared to the peripheral part. As the difference between the predetermined reference value and the stain occurrence leakage voltage increases, it may be easier to control the stain. In the case of the exemplary embodiment, because the difference between the predetermined reference value and the stain occurrence leakage voltage is large as compared to a comparative example, it may be easy to control the stain. Although the stain may be vulnerable to the amount of light emitted from the backlight unit, it is confirmed that the voltage margin for the stain occurrence is improved by providing the color filter overlapping the transistor.

In summary, according to the exemplary embodiment, it is confirmed that the margin for the voltage at which the stain is generated is maintained better, such that the initial threshold voltage is improved, and the deviation of the threshold voltage and the color change of the display device may be reduced, thereby improving the reliability of the display.

In addition, a smear characteristic and a liquid crystal margin evaluation are performed for the exemplary embodiment and the comparative example described above.

It is confirmed through a smear evaluation, which can evaluate a power withstand by the display, that the display device may withstand up to about 9 kgf in the exemplary embodiment, but, in the case of the comparative example, the display device may withstand up to about 6 kgf. As the main spacer and sub-spacer are stably formed, it is confirmed that the durability of the display device is improved.

As a result of evaluating a section number of a liquid crystal margin, 10 sections are obtained according to the exemplary embodiment, but about 7 sections are obtained according to the comparative example. By securing many of the sections of the liquid crystal margin, it is possible to prevent a failure of an active unfilled area (AUA) in which light leakage occurs due to a lack of the liquid crystal in any one portion. In addition, it is possible to prevent a gravity failure caused by excessively filling the liquid crystal. As the separation distance between the first display panel and the second display panel by the spacer is stabilized, the sufficient margin for filling the liquid crystal is secured, which means that the reliability of the display device may be improved.

While this inventive concept has been described in connection with what is presently considered to be practical exemplary embodiments, it is to be understood that the inventive concept is not limited to the disclosed embodiments. On the contrary, it is intended to cover various modifications and equivalent arrangements included within the spirit and scope of the appended claims.

What is claimed is:
1. A display device comprising:
a plurality of transistors disposed on a substrate;
a plurality of pixel electrodes electrically connected to the plurality of transistors;
a plurality of first color filters, a plurality of second color filters, and a plurality of third color filters disposed between the plurality of transistors and the plurality of pixel electrodes; and
a plurality of main spacers and a plurality of sub-spacers disposed on the pixel electrode,
wherein the plurality of main spacers and the plurality of sub-spacers are disposed to overlap selected portions of the plurality of first color filters in a plan view, respectively, and not to overlap the plurality of second color filters and the plurality of third color filters in a plan view.
2. The display device of claim 1, wherein
the plurality of first color filters are red color filters.

3. The display device of claim 1, further comprising
a plurality of color filter patterns overlapping at least one of selected portions of the plurality of second color filters and the plurality of third color filters in a plan view.

4. The display device of claim 3, wherein
the plurality of color filter patterns overlap a plurality of transistors overlapping the plurality of second color filters and a plurality of transistors overlapping the plurality of third color filters in a plan view.

5. The display device of claim 3, wherein
the plurality of color filter patterns are disposed between the plurality of second color filters and the substrate and between the plurality of third color filters and the substrate, and
the plurality of color filter patterns represent the same color as the plurality of first color filters.

6. The display device of claim 3, wherein
each of the plurality of transistors includes a first transistor and a second transistor, and
each of the plurality of main spacers is disposed between the first transistor and the second transistor in a plan view.

7. The display device of claim 6, wherein
each of the plurality of sub-spacers overlaps the first transistor or the second transistor.

8. The display device of claim 6, wherein
each of the plurality of color filter patterns simultaneously overlaps the first transistor and the second transistor.

9. The display device of claim 1, wherein the plurality of sub-spacers including a plurality of first sub-spacers disposed to simultaneously overlap selected portions of the plurality of second color filters and the plurality of third color filters disposed adjacent to each other.

10. The display device of claim 9, wherein the plurality of sub-spacers including a plurality of second sub-spacers disposed to overlap one of the selected portions of the plurality of second color filters or the plurality of third color filters and a plurality of data lines disposed adjacent to the one of the selected portions of the plurality of second color filters or the plurality of third color filters.

11. A display device comprising:
a plurality of transistors disposed on a substrate;
a plurality of pixel electrodes electrically connected to the plurality of transistors;
a plurality of first color filters, a plurality of second color filters, and a plurality of third color filters overlapping the plurality of pixel electrodes;
a plurality of main spacers and a plurality of sub-spacers disposed on the plurality of pixel electrodes; and
a plurality of color filter patterns disposed between the plurality of second color filters and the plurality of transistors, or between the plurality of third color filters and the plurality of transistors,
wherein the plurality of main spacers and the plurality of sub-spacers overlap selected portions of the plurality of color filters representing the same color, and
the plurality of main spacers and the plurality of sub-spacers do not overlap the plurality of color filter patterns.

12. The display device of claim 11, wherein
the plurality of main spacers and the plurality of sub-spacers overlap the selected portions of the plurality of first color filters.

13. The display device of claim 11, wherein
the plurality of main spacers and the plurality of sub-spacers do not overlap the plurality of second color filters and the plurality of third color filters.

14. The display device of claim 11, wherein
the plurality of color filter patterns and the plurality of first color filters represent the same color.

15. The display device of claim 11, wherein
each of the plurality of transistors includes a first transistor and a second transistor, and
each of the plurality of main spacers is disposed between the first transistor and the second transistor in a plan view.

16. The display device of claim 11, wherein
the plurality of color filter patterns are connected to the plurality of first color filters.

17. A display device comprising:
a plurality of transistors disposed on a substrate;
a plurality of pixel electrodes electrically connected to the plurality of transistors;
a plurality of first color filters, a plurality of second color filters, and a plurality of third color filters overlapping the plurality of pixel electrodes;
a plurality of main spacers and a plurality of sub-spacers disposed on the plurality of pixel electrodes; and
a plurality of color filter patterns disposed between selected portions of the plurality of second color filters and the plurality of transistors, or between selected portions of the plurality of third color filters and the plurality of transistors,
wherein the plurality of main spacers and the plurality of sub-spacers overlap selected portions of the plurality of color filters representing the same color,
the plurality of main spacers and the plurality of sub-spacers overlap the selected portions of the plurality of first color filters,
each of the plurality of transistors includes a first transistor and a second transistor, and
each of the plurality of main spacers is disposed between the first transistor and the second transistor in a plan view, and
wherein each of the plurality of sub-spacers overlaps the first transistor or the second transistor.

18. The display device of claim 17, wherein
each of the plurality of color filter patterns simultaneously overlaps the first transistor and the second transistor.

* * * * *